United States Patent
Otaki et al.

(10) Patent No.: US 7,053,171 B2
(45) Date of Patent: May 30, 2006

(54) PRODUCTION METHOD OF POLYAMIDE

(75) Inventors: Ryoji Otaki, Kanagawa (JP); Tomomichi Kanda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/849,027

(22) Filed: May 20, 2004

(65) Prior Publication Data

US 2004/0236068 A1   Nov. 25, 2004

(30) Foreign Application Priority Data

May 20, 2003  (JP) .............................. 2003/141536

(51) Int. Cl.
*C08G 69/08* (2006.01)
*C08G 69/26* (2006.01)

(52) U.S. Cl. ...................... 528/310; 528/322; 528/332; 528/335; 528/336; 528/340

(58) Field of Classification Search ............. 428/473.5; 528/310, 322, 332, 335, 336, 340
See application file for complete search history.

(56) References Cited

U.S. PATENT DOCUMENTS 4,908,272 A * 3/1990 Harada et al. .............. 428/412
5,587,447 A * 12/1996 Harada et al. .............. 528/347
2004/0076781 A1* 4/2004 Kanda et al. .............. 428/35.7

FOREIGN PATENT DOCUMENTS

| EP | 288 972 | 11/1988 |
| EP | 680 987 | 11/1995 |
| EP | 1 413 429 | 4/2004 |

OTHER PUBLICATIONS

Communication and European Search Report dated Jun. 29, 2004, for No. EP 04 01 1336.

* cited by examiner

*Primary Examiner*—P. Hampton Hightower
(74) *Attorney, Agent, or Firm*—Antonelli, Terry, Stout and Kraus, LLP.

(57) ABSTRACT

In the production method of the present invention, the polyamide is produced by the polycondensation of a diamine component and a dicarboxylic acid component comprising a straight-chain $\alpha,\omega$-aliphatic dicarboxylic acid and an aromatic dicarboxylic acid. The dicarboxylic acid component is first made into a suspension phase of the solid aromatic dicarboxylic acid in a molten straight-chain $\alpha,\omega$-aliphatic dicarboxylic acid. A part of the diamine component is added while the reaction system is in the suspension phase. Then, the reaction system is made into a homogeneous molten phase, to which the rest of the diamine component is added. Finally, the reaction system is kept at temperatures within a specific range to complete the polycondensation.

15 Claims, No Drawings

PRODUCTION METHOD OF POLYAMIDE

BACKGROUND OF THE INVENTION

1. Field of the Invention

The present invention relates to a production method of polyamide, more specifically, relates to a highly efficient production method of polyamide having excellent quality with minimized discoloration and deterioration and having stable properties.

2. Description of the Prior Art

Polyamide mainly constituted by m-xylylenediamine and adipic acid (hereinafter referred to as "nylon MXD6") is excellent in mechanical and chemical properties and has been widely used as the raw materials for the production of molding materials and packaging materials. Since the melting point is as relatively high as about 240° C., nylon MXD6 is suitable for the production of composite packaging materials combined with a high melting resin such as poly (ethylene terephthalate). However, if combined with a resin having a melting point lower than that of nylon MXD6, for example, polyolefin such as polyethylene and polypropylene and polyamide such as nylon 6, the heat history on the low melting resin becomes higher than required to likely to cause a rapid heat deterioration thereof.

To overcome the above problem, it is effective to reduce the melting point of nylon MXD6. One method for attaining this is, for example, a method to introduce another kind of repeating unit which is capable of reducing the melting point of nylon MXD into the backbone of nylon MXD6 constituted by m-xylylenediamine/adipic acid repeating units. To reduce the melting point without deteriorating the mechanical and chemical properties of nylon MXD6, it has been proposed to randomly introduce m-xylylenediamine/aromatic dicarboxylic acid repeating units.

The method of introducing the m-xylylenediamine/aromatic dicarboxylic acid repeating unit into nylon MXD6 is proposed, for example, in Japanese Patent Application Laid-Open Nos. 57-200420 and 58-111829. In the proposed methods, polyamide is produced in a batch reactor by adding a diamine component dropwise into a molten dicarboxylic acid component such as adipic acid under atmospheric pressure while raising the temperature of the reaction system to proceed the polycondensation by removing the water released by condensation. This method is advantageous because the yield of polyamide in one batch is high and the apparatus cost is low.

The proposed methods may be practiced by first preparing a molten mixture of dicarboxylic acids by adding an aromatic dicarboxylic acid to a molten adipic acid or by melting a mixture of adipic acid and an aromatic dicarboxylic acid under heating, and then, adding m-xylylenediamine dropwise into the molten mixture of dicarboxylic acids.

Generally, the melting point of aromatic dicarboxylic acid is higher than that of straight-chain $\alpha,\omega$-aliphatic dicarboxylic acid. Therefore, there is a temperature range in which a mixture of dicarboxylic acids is in a suspension phase comprising a molten straight-chain $\alpha,\omega$-aliphatic dicarboxylic acid and a solid aromatic dicarboxylic acid not dissolved in the molten straight-chain $\alpha,\omega$-aliphatic dicarboxylic acid. For example, since adipic acid melts at 170° C. but the aromatic dicarboxylic acid generally remains solid without dissolved in the molten straight-chain $\alpha,\omega$-aliphatic dicarboxylic acid at this temperature, a mixture thereof is in a suspension phase. If a large amount of m-xylylenediamine is added dropwise into a mixture in the suspension phase, the added m-xylylenediamine reacts with the molten adipic acid in preference to the solid aromatic dicarboxylic acid. Therefore, the reaction between m-xylylenediamine with the aromatic dicarboxylic acid does not proceed sufficiently. In addition, the m-xylylenediamine/aromatic dicarboxylic acid repeating units are not randomly introduced in the backbone, but the m-xylylenediamine/adipic acid repeating units and the m-xylylenediamine/aromatic dicarboxylic acid repeating units respectively form distinct blocks, thereby likely to result in the failure of reducing the melting point of polyamide as well as likely to make the mechanical and chemical properties unstable.

To produce a polyamide constituted by randomly arranged m-xylylenediamine/adipic acid repeating units and m-xylylenediamine/aromatic dicarboxylic acid repeating units by enhancing the reaction with the aromatic dicarboxylic acid, proposed is a method of using a nylon salt or its aqueous solution. For example, an aqueous solution of a mixture of a m-xylylenediamine/adipic acid salt and a m-xylylenediamine/aromatic dicarboxylic acid salt which are prepared in advance is heated under pressure in a reaction vessel. Then, the polymerization is proceeded in homogeneous condition while preventing the escape of the diamine component. After fixing the diamine component, the pressure of the reaction system is gradually reduced finally to atmospheric pressure or reduced pressure by releasing the water vapor to complete the polymerization.

However, the method of using the nylon slat as the starting material involves several problems. For example, an about 50% aqueous solution of nylon salt is generally used as the starting material in this method. Therefore, a highly pressure-resistant apparatus is required in the initial stage of polymerization to prevent the solvent water from escaping by distillation. In addition, a large amount of the solvent water and the water released by condensation should be finally removed. During the removal of the water, several troubles are caused, for example, expansion by foaming, solidification of polyamide due to the latent heat of water vaporization, adhesion of polyamide onto the inner wall of the reaction vessel due the large change of reaction liquid level, and heat deterioration of the adhered polyamide. Therefore, it is required to take precautions against these troubles. In addition, the method involves several technical problems because, for example, a large amount of heat energy is needed to remove a large amount of water. Particularly, the method cannot be said as efficient, because the batch yield of polyamide is low. These problems can be somewhat solved by the polymerization methods using the nylon salt described in Japanese Patent Publication Nos. 33-15700 and 43-22874. However, these methods are also cannot be said as efficient, because the steps for isolating and purifying the nylon salt are necessary.

SUMMARY OF THE INVENTION

An object of the present invention is to solve the above problems and provide an efficient method of producing a polyamide having a backbone in which diamine/straight-chain $\alpha,\omega$-aliphatic dicarboxylic acid repeating units and diamine/aromatic dicarboxylic acid repeating units are arranged moderately at random. Another object of the present invention is to provide an efficient method of producing the polyamide with high quality while preventing the discoloration and deterioration.

The inventors have found that a mixture of straight-chain $\alpha,\omega$-aliphatic dicarboxylic acid and aromatic dicarboxylic acid changes its form from a suspension phase to a homogeneous molten phase at a specific temperature or higher as the heating proceeds. As a result of extensive study in view of this finding, the inventors have further found that the objective polyamide is efficiently produced while preventing the discoloration and the formation of degraded products by adding a part of the diamine component to the reaction system before the dicarboxylic acid component changes from the suspension phase to the homogeneous molten phase, and adding the rest of diamine component to the reaction system after the dicarboxylic acid component changes to the homogeneous molten phase. The present invention has accomplished on the basis of these findings.

Thus, the present invention provide a method of producing a polyamide by a polycondensation of a diamine component comprising 70 mol % or more of m-xylylenediamine and a dicarboxylic acid component comprising 60 to 95 mol % of a straight-chain α,ω-aliphatic dicarboxylic acid and 5 to 40 mol % of an aromatic dicarboxylic acid, the method comprising:

(1) a step of heating the dicarboxylic acid component to a temperature not lower than a melting point of the straight-chain α,ω-aliphatic dicarboxylic acid and not higher than 210° C., thereby obtaining a suspension of the aromatic dicarboxylic acid in a molten straight-chain α,ω-aliphatic dicarboxylic acid;
(2) a step of adding the diamine component dropwise to the suspension while maintaining a reaction system at 220° C. or lower;
(3) a step of heating the reaction system to a temperature exceeding 220° C. and not higher than 270° C. while continuing or discontinuing the addition of the diamine component, thereby allowing the reaction system to change from a suspension phase into a homogeneous molten phase;
(4) a step of further adding the diamine component dropwise to the reaction system at 270° C. or lower while maintaining the homogeneous molten phase; and
(5) a step of maintaining the reaction system at 240 to 270° C. after completing the addition of the diamine component, thereby increasing a degree of polymerization, with the proviso that 20 to 60% by weight of a total amount of the diamine component is added while the reaction system is in the suspension phase before changing into the homogeneous molten phase.

DETAILED DESCRIPTION OF THE INVENTION

The present invention will be described below in detail.

In the method of the present invention, the polyamide is produced by the polycondensation of a diamine component comprising 70 mol % or more of m-xylylenediamine and a dicarboxylic acid component comprising 60 to 95 mol % of straight-chain α,ω-aliphatic dicarboxylic acid and 5 to 40 mol % of aromatic dicarboxylic acid.

The diamine component contains m-xylylenediamine in an amount of preferably 70 mol % or more, more preferably 80 mol % or more, and still more preferably 90 mol % or more. When the diamine component contains m-xylylenediamine in an amount of 70 mol % or more, the resultant polyamide acquires excellent gas barrier properties. Examples of diamines other than m-xylylenediamine usable as the diamine component include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl) ether, p-phenylenediamine, p-xylylenediamine and bis(aminomethyl)naphthalene.

The dicarboxylic component comprises 60 to 95 mol % of straight-chain α,ω-aliphatic dicarboxylic acid and 5 to 40 mol % of aromatic dicarboxylic acid, preferably 70 to 95 mol % of straight-chain α,ω-aliphatic dicarboxylic acid and 5 to 30 mol % of aromatic dicarboxylic acid. When the dicarboxylic component contains the straight-chain α,ω-aliphatic dicarboxylic acid in an amount of 60 mol % or more, the reduction in the oxygen barrier properties and the excessive reduction in the crystallizability can be avoided. Examples of the straight-chain α,ω-aliphatic dicarboxylic acids include aliphatic dicarboxylic acids such as succinic acid, glutaric acid, adipic acid, pimelic acid, suberic acid, azelaic acid, sebacic acid, undecanedioic acid and dodecanedioic acid, with adipic acid being particularly preferred. Examples of the aromatic dicarboxylic acid include terephthalic acid, isophthalic acid and 2,6-naphthalenedicarboxylic acid, with terephthalic acid and isophthalic acid being preferred, and isophthalic acid being particularly preferred.

The method of producing polyamide of the present invention will be described below. The method is performed in a batch reaction vessel. Since the reaction proceeds under atmospheric pressure or reduced pressure of about 0.05 to 0.1 MPa, no specific means for resisting pressure is needed. The production method of the present invention is performed according to the following sequential steps:

(1) a step of heating the dicarboxylic acid component to a temperature not lower than a melting point of the straight-chain α,ω-aliphatic dicarboxylic acid and not higher than 210° C., thereby obtaining a suspension of the aromatic dicarboxylic acid in a molten straight-chain α,ω-aliphatic dicarboxylic acid;
(2) a step of adding the diamine component dropwise to the suspension while maintaining a reaction system at 220° C. or lower;
(3) a step of heating the reaction system to a temperature exceeding 220° C. and not higher than 270° C. while continuing or discontinuing the addition of the diamine component, thereby allowing the reaction system to change from a suspension phase into a homogeneous molten phase;
(4) a step of further adding the diamine component dropwise to the reaction system at 270° C. or lower while maintaining the homogeneous molten phase; and
(5) a step of maintaining the reaction system at 240 to 270° C. after completing the addition of the diamine component, thereby increasing a degree of polymerization.

In Step 1, the dicarboxylic acid component may be charged into the reaction vessel in any manner as long as it is made into the suspension phase before starting the dropwise addition of the diamine component. For example, the charging may be effected by charging the straight-chain α,ω-aliphatic dicarboxylic acid simultaneously with the aromatic dicarboxylic acid into the reaction vessel, by first charging the aromatic dicarboxylic acid into the reaction vessel to which a molten straight-chain α,ω-aliphatic dicarboxylic acid is then added, or by first charging a molten straight-chain α,ω-aliphatic dicarboxylic acid to which the aromatic dicarboxylic acid is then added. To maintain the suspension phase, the suspension of the dicarboxylic acids is preferably heated to around the melting point of the straight-chain α,ω-aliphatic dicarboxylic acid or higher. However, if heated to excessively high temperatures, the straight-chain α,ω-aliphatic dicarboxylic acid sublimates and partly escapes out of the reaction system, changing the molar balance of the polyamide being produced to result in a failure of producing a polyamide having a sufficiently high molecular weight in some cases. In addition, the excessive heating promotes the degradation of the dicarboxylic acid component to unfavorably cause the discoloration and the reduction in the mechanical properties of the resultant polyamide. Therefore, in Step 1, it is preferred to heat the dicarboxylic acid component to temperatures not lower than the melting point of the straight-chain α,ω-aliphatic dicarboxylic acid and not higher than 210° C.

In Step 2, a part of the diamine component is continuously or intermittently added dropwise to the suspension of the dicarboxylic acid component to proceed the polymerization while removing the water released by polycondensation. To allow the straight-chain α,ω-aliphatic dicarboxylic acid to be in the molten state and allow at least a part of the aromatic dicarboxylic acid to remain as solid without dissolving, the reaction system is maintained at 220° C. or lower. The added diamine component reacts with the straight-chain α,ω-aliphatic dicarboxylic acid in preference to the aromatic dicarboxylic acid. Step 2 is preferably performed for 10 to 150 min.

In Step 3, the reaction system is made into the homogeneous molten phase by continuously or intermittently heating to a temperature higher than 220° C. but not higher than 270° C. preferably at a temperature rise rate of 0.05 to 5° C./min to allow the aromatic dicarboxylic acid to completely dissolve, thereby facilitating the reaction of the aromatic dicarboxylic acid with the diamine. The heating for changing the reaction system from the suspension phase into the homogeneous molten phase may be performed while continuing or discontinuing the addition of the diamine component after completing the addition of the diamine component of Step 2. In either case, it is important to raise the temperature so as to prevent the reaction system from solidifying. If the temperature of the reaction system exceeds 270° C., the amounts of the non-reacted dicarboxylic acid component and diamine component which escape out of the reaction system by sublimation and evaporation increase to change the molar balance, thereby resulting in a failure of producing a polyamide having a sufficiently high molecular weight in some cases. In addition, the excessive heating promotes the degradation of the polyamide being produced to unfavorably cause the discoloration and the reduction in the mechanical properties of the resultant polyamide. In Step 3, the change from the suspension phase into the homogeneous molten phase is effected preferably in 0 to 30 min.

In the present invention, a part of the diamine component is added while the reaction system is in the suspension phase before changing into the homogeneous molten phase, and the rest of the diamine component is added after the reaction system changes into the homogeneous molten phase. Namely, a part of the diamine component is added in Step 2 while maintaining the reaction system in the suspension phase by holding the reaction system at 220° C. or lower. In addition, if desired, the diamine component may be further added in Step 3 while the reaction system is in the suspension phase before changing into the homogeneous molten phase. The amount of the diamine component to be added in Step 2 and optionally in Step 3 while the reaction system is in the suspension phase is preferably 20 to 60% by weight, more preferably 30 to 50% by weight of the total diamine component. If added in an amount of exceeding 60% by weight, the diamine/straight-chain α,ω-aliphatic dicarboxylic acid repeating units may excessively grow to unfavorably produce a highly blocked polyamide. In addition, the temperature of the reaction system unfavorably becomes below the melting point of the polyamide being produced which increases with the progress of polymerization, thereby likely to cause the solidification of the polyamide being produced in the reaction vessel. If added in an amount of less than 20% by weight, the non-reacted straight-chain α,ω-aliphatic dicarboxylic acid sublimates and partly escapes out of the reaction system when the reaction system is heated in the subsequent step. This changes the molar balance of the polyamide being produced to result in a failure of producing a polyamide having a sufficiently high molecular weight in some cases. In addition, the excessive heating promotes the degradation of the dicarboxylic acid component to unfavorably cause the discoloration and the reduction in the mechanical properties of the resultant polyamide.

When the diamine component is added also in Step 3, the weight ratio of the addition amount in Step 2 and the addition amount of Step 3 is preferably 95:5 to 50:50. The amount of the diamine component to be added in Step 2 is preferably controlled to a relatively large amount within the above range when the content of the aromatic dicarboxylic acid in the dicarboxylic acid component is lower, and to a relatively small amount when the content of the aromatic dicarboxylic acid is higher, because a polyamide having stable properties is produced with a high duplicability.

In Step 4, the rest of the diamine component, preferably 40 to 80% by weight, more preferably 50 to 70% by weight of the total diamine component, is added preferably over 30 to 150 min while maintaining the reaction system in the homogeneous molten phase. Like Step 3, the reaction system of Step 4 is preferably kept at 270° C. or lower. The lower limit of the temperature is not specifically limited as long as the reaction system is maintained in the homogeneous molten phase.

In Step 5, after completing the addition of the diamine component, the molecular weight of polyamide is increased while preventing the reaction system from solidifying by maintaining the reaction system at 240 to 270° C. preferably for 20 to 120 min under atmospheric pressure or reduced pressure. Preferably, the degree of polymerization is increased under reduced pressure, for example, about 0.05 to 0.1 MPa, while efficiently removing the water generated by condensation. If the temperature of the reaction system is below 240° C., a sufficient reaction rate of polycondensation is not obtained to need a long reaction time until reaching an intended molecular weight level and cause the polyamide being produced to be subject to an excessive heat history, unfavorably resulting in the discoloration and the reduction in the mechanical properties of the resultant polyamide. If exceeding 270° C., the amounts of the non-reacted dicarboxylic acid component and diamine component which escape out of the reaction system by sublimation and evaporation increase to change the molar balance, thereby resulting in a failure of producing a polyamide having a sufficiently high molecular weight in some cases. In addition, the excessive heating promotes the degradation of the polyamide being produced to unfavorably cause the discoloration and the reduction in the mechanical properties of the resultant polyamide.

The time required from the charging of the starting materials until the polymerization is completed is preferably 3 to 7 h.

The polyamide produced by following the steps described above has a backbone in which diamine/straight-chain α,ω-aliphatic dicarboxylic acid repeating units and diamine/aromatic dicarboxylic acid repeating units are arranged moderately at random. In addition, the polyamide has excellent quality with minimized discoloration and degradation. The production method of the present invention is excellent in productivity, as described above, because of its high batch yield as compared to the known method using the nylon salt.

The polyamide produced by the present invention preferably has a number average molecular weight of 11500 to 18500, a relative viscosity of 1.8 to 2.3, a melting point of 232° C. or lower, a half-crystallization time of 300 s or more, and an oxygen transmission coefficient of 0.06 to 0.10 ml.mm/m$^2$.day.MPa. Comparing to polyamides produced by conventional melt polymerization methods in which the diamine component is added in a different manner as defined in the present invention, the melting point is lowered by 1° C. or more and/or the yellowness index is reduced to 5 to 60% by the method of the present invention when the monomers in the same composition are used.

The polyamide produced in the production method of the present invention may be further subjected to solid phase polymerization by a known method to increase the degree of polymerization. To improve the heat stability and other properties, the polyamide may contain a nucleating agent; an antioxidant, heat stabilizer or discoloration inhibitor such as copper compound, organic or inorganic halogen compound, hindered phenol, hindered amine, hydrazine compound, sulfur compound, phosphorus compound including sodium, potassium, calcium and magnesium salts of hypophosphorous acid; benzotriazole ultraviolet absorber; mold releasing agent; plasticizer; colorant; flame retarder; and other additives such as phyllosilicate, organic or inorganic salts of metal such as Co, Mn and Zn and complex.

The polyamide obtained in the present invention is useful as the raw materials for shaped articles and packaging materials. Because of its reduced melting point, the polyamide obtained in the present invention is particularly suitable as the raw materials for the composites in combination with a thermoplastic resin having a relatively low processing temperature, for example, polyolefin, polyamide, ethylene-vinyl alcohol copolymer, thermoplastic elastomer, etc.

The present invention will be explained in more detail by reference to the following example which should not be construed to limit the scope of the present invention.

In the following examples and comparative examples, the polyamide was evaluated in the following manners.

(1) Relative Viscosity of Polyamide

Accurately weighed one gram of polyamide resin was dissolved in 100 cc of 96% sulfuric acid at 20 to 30° C. under stirring. Immediately after complete dissolution, 5 cc of the resulting solution was placed in a Canon Fenske viscomoter, and the viscometer was allowed to stand in a thermostatic chamber maintained at 25±0.03° C. for 10 min. Then, a dropping time (t) of the solution was measured. Also, a dropping time ($t_0$) of the 96% sulfuric acid was measured. The relative viscosity was calculated from the measured t and $t_0$ according to the following formula:

Relative Viscosity=$t/t_0$.

(2) Melting Point of Polyamide

Measured at a temperature rise rate of 10° C./min in nitrogen stream using a differential scanning calorimeter "DSC-50" available from Shimadzu Corporation.

(3) Half-Crystallization Time of Polyamide

After melting a polyamide at 260° C., the molten polyamide was allowed to crystallize at a constant temperature of 160° C. to measure the half-crystallization rate by using an apparatus for measuring crystallization rate of polymer "MK 701" available from Kotaki Seisakusho Co., Ltd.

(4) Yellowness Index (YI) of Polyamide

Measured according to JIS K-7105 (ASTM D-1003) using a calorimeter equipped with a measuring device Σ80 and an optical system of Z-II Optical Sensor available from Nippon Denshoku Kogyo Co., Ltd.

(5) Oxygen Transmission Coefficient of Polyamide

A polyamide was extruded from an extruder through a T-die into a film of 50 μm thick, which was measured for the oxygen transmission rate under conditions of 23° C. and 60% relative humidity by using "OX-Tran 10/50" available form Modern Controls Corporation. The oxygen transmission coefficient was calculated from the measured oxygen transmission rate.

EXAMPLE 1

Into a jacketed 50-L reaction vessel equipped with a stirring device, a partial condenser, a total condenser, a thermometer, a dropping tank and a nitrogen inlet, were charged accurately weighed 13.91 kg (95.20 mol) of adipic acid and 1.01 kg (6.08 mol) of isophthalic acid. After thoroughly replacing the inner atmosphere with nitrogen, the contents were heated to 170° C. with stirring under a small amount of nitrogen stream. By the heating, the adipic acid melted and the contents changed to a suspension. The dropwise addition of m-xylylenediamine into the resultant suspension in the total amount of 13.71 kg (100.64 mol) was started under stirring. The reaction system was continuously heated while removing the water generated by condensation out of the reaction system. The dropwise addition of m-xylylenediamine was continued while monitoring the state of the reaction system. When 20% by weight of the total amount was added, the reaction system had a temperature of 205° C. and was in a suspension phase. When about 50% by weight of the total amount was added, the reaction system had a temperature of 225° C. and changed to a homogeneous molten phase. After completing the addition of m-xylylenediamine, the reaction system was kept at 255° C. for 40 min to continue the polymerization. The time required from the charging of the starting materials until the polymerization was completed was four hours and twenty minutes, and 25.0 kg of polyamide was obtained. The obtained polyamide had a relative viscosity of 2.05, a melting point of 230° C., a half-crystallization time of 335 s, a yellowness index of 0.4, and an oxygen transmission coefficient of 0.71 ml.mm/m$^2$.day.MPa. The obtained polyamide was not contaminated with foreign matters resulted from degraded polyamide and non-melted aromatic dicarboxylic acid.

COMPARATIVE EXAMPLE 1

Into a jacketed 50-L reaction vessel (pressure resistance: 2.5 MPa) equipped with a stirring device, a condenser, a thermometer and a nitrogen inlet, were charged accurately weighed 9.46 kg (64.72 mol) of adipic acid, 0.69 kg (4.13 mol) of isophthalic acid, 9.32 kg (68.44 mol) of m-xylylenediamine and 8.34 kg of distilled water. The inner atmosphere of the reaction vessel was replace with nitrogen of a purity of 99% by volume or higher until the oxygen concentration was reduced to less than 0.1% by volume. Then the mixture was hermetically heated to 172° C. After reaching 0.6 MPa, the inner pressure was held at 0.6 MPa and the reaction system was stirred for 120 min while removing the distilled water by raising the temperature from 172° C. to 217° C. Thereafter, the temperature of reaction system was continuously raised from 217° C. to 243° C. over 30 min while reducing the inner pressure to atmospheric pressure over 60 min. The temperature of reaction system was then raised to 255° C. over 20 min in nitrogen stream under atmospheric pressure, and the polymerization was further continued for 40 min. The time required from the charging of the starting materials until the polymerization was completed was six hours, and 17.0 kg of polyamide was obtained. The obtained polyamide had a relative viscosity of 2.02, a melting point of 231° C., a half-crystallization time of 339 s, a yellowness index of 0.5, and an oxygen transmission coefficient of 0.73 ml.mm/m$^2$.day.MPa. The obtained polyamide was not contaminated with foreign matters resulted from degraded polyamide and non-reacted aromatic dicarboxylic acid.

It was found that the polyamide of Example 1 produced by the method of the present invention had properties comparable to those of the polyamide produced in Comparative Example 1, and had a backbone in which the m-xylylenediamine/adipic acid repeating units and the m-xylylenediamine/isophthalic acid repeating units are arranged moderately at random. The reaction vessels of the same capacity were used in the same charge filling in both Example 1 and Comparative Example 1. However, in Example 1, a better batch yield of polyamide was obtained and a shorter time and a smaller heat energy were required for completing the polymerization, as compared to Comparative Example 1, showing the excellent productivity of the production method of the present invention.

EXAMPLE 2

In a jacketed 50-L reaction vessel of the same type as used in Example 1, were charged accurately weighed 12.49 kg (85.44 mol) of adipic acid and 2.51 kg (15.08 mol) of isophthalic acid. After thoroughly replacing the inner atmosphere with nitrogen, the contents were heated to 170° C. with stirring under a small amount of nitrogen stream. By the heating, the adipic acid melted and the contents changed to a suspension. The dropwise addition of m-xylylenediamine into the resultant suspension in the total amount of 13.61 kg (99.92 mol) was started under stirring. The reaction system was continuously heated while removing the water generated by condensation out of the reaction system. The dropwise addition of m-xylylenediamine was continued while monitoring the state of the reaction system. When 20% by weight of the total amount was added, the reaction system had a temperature of 205° C. and was in a suspension phase. When about 40% by weight of the total amount was added, the reaction system had a temperature of 225° C. and changed to a homogeneous molten phase. After completing the addition of m-xylylenediamine, the reaction system was kept at 255° C. for 40 min to continue the polymerization. The time required from the charging of the starting materials until the polymerization was completed was four hours and thirty minutes, and 25.0 kg of polyamide was obtained. The obtained polyamide had a relative viscosity of 1.93, a half-crystallization time of 1820 s, a yellowness index of 6.4, and an oxygen transmission coefficient of 0.74 ml.mm/m$^2$.day.MPa. The obtained polyamide was not contaminated with foreign matters resulted from degraded polyamide and non-reacted aromatic dicarboxylic acid.

EXAMPLE 3

In a jacketed 50-L reaction vessel of the same type as used in Example 1, were charged accurately weighed 10.16 kg (69.53 mol) of adipic acid and 4.95 kg (29.80 mol) of isophthalic acid. After thoroughly replacing the inner atmosphere with nitrogen, the contents were heated to 170° C. with stirring under a small amount of nitrogen stream. By the heating, the adipic acid melted and the contents changed to a suspension. The dropwise addition of m-xylylenediamine into the resultant suspension in the total amount of 13.45 kg (98.73 mol) was started under stirring. The reaction system was continuously heated while removing the water generated by condensation out of the reaction system. The dropwise addition of m-xylylenediamine was continued while monitoring the state of the reaction system. When 20% by weight of the total amount was added, the reaction system had a temperature of 205° C. and was in a suspension phase. When about 40% by weight of the total amount was added, the reaction system had a temperature of 225° C. and changed to a homogeneous molten phase. After completing the addition of m-xylylenediamine, the reaction system was kept at 255° C. for 40 min to continue the polymerization. The time required from the charging of the starting materials until the polymerization was completed was four hours and thirty minutes, and 25.0 kg of polyamide was obtained. The obtained polyamide had a relative viscosity of 1.91, a yellowness index of 16.3, and an oxygen transmission coefficient of 0.74 ml.mm/m$^2$.day.MPa. The obtained polyamide was not contaminated with foreign matters resulted from degraded polyamide and non-reacted aromatic dicarboxylic acid.

COMPARATIVE EXAMPLE 2

A polyamide was produced in the same manner as in Example 1 except that the addition of m-xylylenediamine was started after the mixture of the dicarboxylic acids changed to a homogeneous molten phase by heating to 225° C., and that the reaction system was held at 225° C. until about 50% by weight of the total amount of m-xylylenediamine was added. The time required from the charging of the starting materials until the polymerization was completed was four hours and twenty minutes, and 25.0 kg of polyamide was obtained. The obtained polyamide had a relative viscosity of 1.68, a melting point of 230° C., a half-crystallization time of 283 s, a yellowness index of 5.3, and an oxygen transmission coefficient of 0.73 ml.mm/m$^2$.day.MPa. As compared to Example 1, the relative viscosity was low, the yellowness index was high and the half-crystallization time was short. The obtained polyamide was discolored and instable in its properties.

COMPARATIVE EXAMPLE 3

A polyamide was produced in the same manner as in Example 1 except that the addition of m-xylylenediamine was started after the mixture of the dicarboxylic acids changed to a suspension phase by heating to 170° C., and that the reaction system was allowed to change to a homogeneous molten phase by heating to 230° C. when about 10% by weight of the total amount of m-xylylenediamine was added. The time required from the charging of the starting materials until the polymerization was completed was four hours and twenty minutes, and 25.0 kg of polyamide was obtained. The obtained polyamide had a relative viscosity of 1.78, a melting point of 230° C., a half-crystallization time of 267 s, a yellowness index of 6.5, and an oxygen transmission coefficient of 0.75 ml.mm/m$^2$.day.MPa. As compared to Example 1, the relative viscosity was low, the yellowness index was high and the half-crystallization time was short. The obtained polyamide was discolored and instable in its properties.

COMPARATIVE EXAMPLE 4

A polyamide was produced in the same manner as in Example 1 except that the reaction system was maintained in a suspension phase by holding the temperature at 210° C. until 60% by weight of the total amount of m-xylylenediamine was added, and that the reaction system was allowed to change to a homogeneous molten phase by heating to 230° C. when about 70% by weight of the total amount of m-xylylenediamine was added. The time required from the charging of the starting materials until the polymerization was completed was four hours and forty minutes, and 25.0 kg of polyamide was obtained. The obtained polyamide had a relative viscosity of 1.72, a melting point of 233° C., a half-crystallization time of 234 s, a yellowness index of 0.5, and an oxygen transmission coefficient of 0.75 ml.mm/m$^2$.day.MPa. The obtained polyamide was contaminated with white foreign matters attributable to the aromatic dicarboxylic acid insufficiently reacted. As compared to Example 1, the obtained polyamide had a lower relative viscosity and a shorter half-crystallization time, and was instable in its properties.

COMPARATIVE EXAMPLE 5

A polyamide was produced in the same manner as in Example 1 except that the reaction system was heated to 235° C. after completing the addition of m-xylylenediamine to further proceed the polycondensation. The time required from the charging of the starting materials until the polymerization was completed was six hours and forty minutes, and 25.0 kg of polyamide was obtained. The obtained polyamide had a relative viscosity of 1.74, a melting point of 280° C., a half-crystallization time of 262 s, a yellowness index of 3.5, and an oxygen transmission coefficient of 0.74 ml.mm/m$^2$.day.MPa. As compared to Example 1, the relative viscosity was low, the yellowness index was high and the half-crystallization time was short. The obtained polyamide was discolored and instable in its properties.

COMPARATIVE EXAMPLE 6

A polyamide was produced in the same manner as in Example 1 except that the reaction system was heated to 280° C. after completing the addition of m-xylylenediamine to further proceed the polycondensation. The time required from the charging of the starting materials until the polymerization was completed was four hours and twenty minutes, and 25.0 kg of polyamide was obtained. The obtained polyamide had a relative viscosity of 1.99, a melting point of 228° C., a half-crystallization time of 347 s, a yellowness index of 7.5, and an oxygen transmission coefficient of 0.76 ml.mm/m$^2$.day.MPa. As compared to Example 1, the yellowness index was high and the half-crystallization time was long. The obtained polyamide was discolored and instable in its properties, and slightly contaminated with brown foreign matter attributable to heat-degraded products.

The production method of the present invention is a method excellent in the productivity for producing polyamides stable in their mechanical and chemical properties. According to the present invention, high-quality polyamides with minimized discoloration and degradation are produced. The polyamides produced by the present invention are used as the materials for shaped articles and packaging materials. Thus, the present invention is of great industrial value.

What is claimed is:

1. A method of producing a polyamide by a polycondensation of a diamine component comprising 70 mol % or more of m-xylylenediamine and a dicarboxylic acid component comprising 60 to 95 mol % of a straight-chain α, ω-aliphatic dicarboxylic acid and 5 to 40 mol % of an aromatic dicarboxylic acid, the method comprising:
   (1) a step of heating the dicarboxylic acid component to a temperature not lower than a melting point of the straight-chain α, ω-aliphatic dicarboxylic acid and not higher than 210° C., thereby obtaining a suspension of the aromatic dicarboxylic acid in a molten straight-chain α, ω-aliphatic dicarboxylic acid;
   (2) a step of adding the diamine component comprising 70 mol % or more of m-xylylenediamine dropwise to the suspension while maintaining a reaction system at 220° C. or lower;
   (3) a step of heating the reaction system to a temperature exceeding 220° C. and not higher than 270° C. while continuing or discontinuing the addition of the diamine component, thereby allowing the reaction system to change from a suspension phase into a homogeneous molten phase;
   (4) a step of further adding the diamine component dropwise to the reaction system at 270° C. or lower while maintaining the homogeneous molten phase; and
   (5) a step of maintaining the reaction system at 240 to 270° C. after completing the addition of the diamine component, thereby increasing a degree of polymerization,
   with the proviso that 20 to 60% by weight of a total amount of the diamine component is added while the reaction system is in the suspension phase before changing into the homogeneous molten phase.

2. The method according to claim 1, wherein the aromatic dicarboxylic acid is at least one of isophthalic acid and terephthalic acid.

3. The method according to claim 1, wherein the straight-chain α, ω-aliphatic dicarboxylic acid is at least one dicarboxylic acid selected from the group consisting of succinic acid, glutaric acid, adipic acid, pimelic acid, suberic acid, azelaic acid, sebacic acid, undecanedioic acid and dodecanedioic acid.

4. The method according to claim 1, wherein the straight-chain α, ω-aliphatic dicarboxylic acid is adipic acid.

5. The method according to claim 1, wherein the diamine component is continuously or intermittently added in Step 2 over 10 to 150 min.

6. The method according to claim 1, wherein the reaction system is continuously or intermittently heated over 0 to 30 min to allow the reaction system to change from the suspension phase into the homogeneous molten phase.

7. The method according to claim 6, wherein the reaction system is heated at a temperature rise rate of 0.05 to 50° C./min.

8. The method according to claim 1, wherein 40 to 80% by weight of the total amount of the diamine component is continuously or intermittently added over 30 to 150 min in Step 4.

9. The method according to claim 1, wherein Step 5 is performed in 20 to 120 min.

10. The method according to claim 1, wherein the diamine component added in Step 4 is the same diamine component as that added in Step 2.

11. The method according to claim 1, wherein the dicarboxylic acid component comprises 70 to 95 mol % of straight-chain α, ω-aliphatic dicarboxylic acid and 5 to 30 mol % of aromatic dicarboxylic acid.

12. The method according to claim 1, wherein 30 to 50% by weight of the total amount of the diamine component is added while the reaction system is in the suspension phase.

13. The method according to claim 1, wherein the Step 4 of further adding the diamine component is performed after the Step 3 of heating the reaction system thereby allowing the reaction system to change from a suspension phase into a homogeneous molten phase.

14. The method according to claim 1, wherein said diamine component comprises 80 mol % or more of m-xylylenediamine, said diamine component comprising 80 mol % or more of m-xylylenediamine being added in Step 2 to the suspension.

15. The method according to claim 1, wherein said diamine component comprises 90 mol % or more of m-xylylenediamine, said diamine component comprising 90 mol % or more of m-xylylenediamine being added in Step 2 to the suspension.

* * * * *